US 11,893,496 B2

(12) United States Patent
Nguyen

(10) Patent No.: US 11,893,496 B2
(45) Date of Patent: Feb. 6, 2024

(54) METHOD FOR RECOGNIZING OBJECTS IN AN ENVIRONMENT OF A VEHICLE

(71) Applicant: Robert Bosch GmbH, Stuttgart (DE)

(72) Inventor: Viet Duc Nguyen, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 302 days.

(21) Appl. No.: 17/158,104

(22) Filed: Jan. 26, 2021

(65) Prior Publication Data

US 2021/0232833 A1 Jul. 29, 2021

(30) Foreign Application Priority Data

Jan. 27, 2020 (DE) ...................... 10 2020 200 911.2

(51) Int. Cl.
| | |
|---|---|
| *G06N 3/084* | (2023.01) |
| *G06N 20/00* | (2019.01) |
| *G06V 20/58* | (2022.01) |
| *G06F 18/21* | (2023.01) |
| *G06V 10/764* | (2022.01) |
| *G06V 10/82* | (2022.01) |
| *G06V 20/56* | (2022.01) |

(52) U.S. Cl.
CPC ........... *G06N 3/084* (2013.01); *G06F 18/217* (2023.01); *G06N 20/00* (2019.01); *G06V 10/764* (2022.01); *G06V 10/82* (2022.01); *G06V 20/56* (2022.01); *G06V 20/58* (2022.01)

(58) Field of Classification Search
CPC ...... G06V 20/58; G06V 10/764; G06V 20/56; G06V 10/82; G06K 9/6262; G06N 20/00; G06N 3/084; G08G 1/166; G01C 21/28; G01C 21/165; B60W 50/0097; G01S 13/931; G01S 17/931; G01S 19/41
See application file for complete search history.

(56) References Cited

U.S. PATENT DOCUMENTS

| | | | | |
|---|---|---|---|---|
| 5,867,397 A | * | 2/1999 | Koza ...................... | G06F 30/36 703/2 |
| 10,696,298 B2 | * | 6/2020 | Movert .................... | G06N 3/08 |

(Continued)

FOREIGN PATENT DOCUMENTS

| | | | |
|---|---|---|---|
| DE | 10 2016 215 314 A1 | 2/2018 | |
| WO | WO-2016156236 A1 * | 10/2016 | ........... G01S 13/867 |

*Primary Examiner* — Lewis G West
(74) *Attorney, Agent, or Firm* — Maginot, Moore & Beck LLP

(57) ABSTRACT

A method recognizes objects in an environment of a vehicle including a sensor system having at least one sensor unit for registering the environment and an evaluation unit for evaluating sensor data provided by the at least one sensor unit. The method includes receiving the sensor data in the evaluation unit, the sensor data including a plurality of chronologically successive measurements; inputting the sensor data into a machine learning module; and outputting an object state of at least one object estimated based on the sensor data by way of the machine learning module. The method further includes determining a plurality of chronologically successive future object states based on the estimated object state; ascertaining deviations between the future object states and measurements chronologically corresponding to the future object states based on the sensor data; and correcting a machine learning algorithm of the module based on the deviations.

11 Claims, 3 Drawing Sheets

(56) References Cited

U.S. PATENT DOCUMENTS

| | | | |
|---|---|---|---|
| 10,698,407 B2* | 6/2020 | Ostafew | G05D 1/0088 |
| 10,745,011 B2* | 8/2020 | Zhao | B60W 30/18163 |
| 11,378,955 B2* | 7/2022 | Censi | G05D 1/0257 |
| 2005/0228789 A1* | 10/2005 | Fawcett | G06N 20/00 |
| 2010/0138368 A1* | 6/2010 | Stundner | G06N 20/00 |
| | | | 706/47 |
| 2017/0111432 A1* | 4/2017 | Saini | G06F 11/3409 |
| 2017/0287170 A1* | 10/2017 | Perona | G06V 20/56 |
| 2018/0053108 A1* | 2/2018 | Olabiyi | G01C 21/3848 |
| 2018/0217595 A1* | 8/2018 | Kwon | H04L 67/12 |
| 2018/0217603 A1* | 8/2018 | Kwon | H04L 67/12 |
| 2019/0176818 A1* | 6/2019 | Movert | G06N 3/045 |
| 2019/0243371 A1 | 8/2019 | Nister et al. | |
| 2019/0265050 A1* | 8/2019 | Fujimoto | G01C 21/3881 |
| 2019/0291728 A1* | 9/2019 | Shalev-Shwartz | |
| | | | B60W 30/165 |
| 2021/0125356 A1* | 4/2021 | Wang | G06Q 20/12 |
| 2021/0215505 A1* | 7/2021 | Castorena Martinez | |
| | | | G01C 25/005 |
| 2021/0276594 A1* | 9/2021 | Oh | G06N 3/047 |
| 2021/0370980 A1* | 12/2021 | Ramamoorthy | G06V 10/84 |
| 2021/0404814 A1* | 12/2021 | Hess | G06V 20/64 |
| 2022/0283587 A1* | 9/2022 | Kabzan | B60W 40/105 |

\* cited by examiner

METHOD FOR RECOGNIZING OBJECTS IN AN ENVIRONMENT OF A VEHICLE

This application claims priority under 35 U.S.C. § 119 to patent application no. DE 10 2020 200 911.2, filed on Jan. 27, 2020 in Germany, the disclosure of which is incorporated herein by reference in its entirety.

The disclosure relates to a method, an evaluation unit, a computer program product, and a computer-readable medium for recognizing objects in an environment of a vehicle. Furthermore, the disclosure relates to a vehicle system having such an evaluation unit.

BACKGROUND

In automated driving and in driver assistance systems, a representation of a vehicle environment is typically used, for example in the form of object lists. The objects describe, for example, other road users, pedestrians, or vehicles. Based on a (dynamic) state of the objects, a function decides how the ego vehicle is supposed to behave. For example, if an automated vehicle is to execute a lane change on a multilane road, a respective velocity and a respective direction of other road users are required for this purpose, in order to be able to recognize potential collisions and react accordingly.

A machine learning method is conceivable for improving the object recognition. Object instances can already be extracted from camera images and lidar measurements using neural networks today. For example, a 3D object box can be extracted from lidar measurements. However, for this purpose large quantities of data have to be annotated accordingly, also called labeling, so that, for example a neural network can be trained. Such labeling can be linked to high cost and time expenditure. Moreover, primarily directly measurable state variables such as position, extension, or orientation are learned.

DE 10 2016 215 314 A1 and US 2019/0 243 371 A1 disclose systems for recognizing objects with use of machine learning.

SUMMARY

Against this background, a method, an evaluation unit, a computer program product, a computer-readable medium, and a vehicle system according to the independent claims are presented by the approach presented here. Advantageous refinements and improvements of the approach presented here result from the description and are described in the dependent claims.

Embodiments of the present disclosure advantageously enable object-related variables to be estimated by means of a machine learning algorithm based on non-annotated sensor data. In addition to an estimation of directly measurable variables such as positions, orientations, or dimensions of objects, an estimation of indirectly measurable variables such as velocities or accelerations is also enabled here.

A first aspect of the disclosure relates to a computer-implemented method for recognizing objects in an environment of a vehicle, wherein the vehicle comprises a sensor system having at least one sensor unit for registering the environment and an evaluation unit for evaluating sensor data provided by the at least one sensor unit. The method comprises the following steps: receiving the sensor data in the evaluation unit, wherein the sensor data comprise a plurality of chronologically successive measurements; inputting the sensor data into a machine learning algorithm; outputting an object state of at least one object estimated based on the sensor data by way of the machine learning algorithm; determining a plurality of chronologically successive future object states based on the estimated object state; ascertaining deviations between the future object states and measurements chronologically corresponding to the future object states based on the sensor data; and correcting the machine learning algorithm based on the deviations.

In general, correspondingly annotated data are required for learning indirectly measurable state variables such as velocity, acceleration, or yaw rate by way of a machine learning algorithm. A direct measurement of the mentioned dynamic properties would be possible if a corresponding measuring device, such as a DGPS receiver (DGPS=differential global positioning system) were installed in all objects. It is possible in principle to ascertain the dynamic properties indirectly via the object positions at successive points in time. However, primarily lidar sensors are suitable for this purpose, since other types of sensors such as cameras or radar sensors generally cannot ensure the required accuracy. The training of the machine learning algorithm would thus be restricted to items of information of a single type of sensor. In addition, data labeling would again be necessary for this purpose.

To remedy this, a self-monitoring learning method for a state estimation, in particular a multisensor state estimation, is proposed, in which estimated states of a point in time are predicted in subsequent measurement points in time, measurements to be expected are generated based on the prediction, and the measurements to be expected are compared to actual measurements. A difference between the measurements to be expected and the actual measurements can then be used as a correction for the machine learning algorithm, for example for an artificial neural network or the like. A complex annotation of the sensor data can thus be omitted.

The term "recognizing" is not to be understood in the context of the method described above and in the following as restrictive in terms of a recognition of objects primarily taking place in the sensor system, but also in terms of a prediction, i.e., an object state estimation, in which probable future states of an already recognized object are determined. More precisely, the method primarily relates to processing of sensor data with the goal of object state estimation, wherein the sensor data, i.e., the data output by the sensor system, can already comprise an object recognition. For example, a camera can recognize vehicles and provide image coordinates of the recognized vehicles as a measurement. A radar sensor can provide, for example positions of radar reflections as a measurement, wherein it is not necessarily known, however, whether or not the radar reflections originate from a vehicle.

The sensor unit can be, for example a camera, a radar sensor, a lidar sensor, or an ultrasonic sensor. The sensor system can comprise a plurality of different types of sensor units.

A vehicle can be understood as a motor vehicle, for example a passenger vehicle, truck, bus, or motorcycle. In the broader meaning, a robot can also be considered to be a vehicle, which can be embodied to move automatically, in particular to carry out locomotion.

A machine learning algorithm can generally be understood as an algorithm which, for a given set of inputs, generates a statistical model to describe the inputs, recognized categories, and relationships and to output corresponding predictions. The machine learning algorithm can comprise, for example a Bayes classifier, a support vector machine (SVM), a k-nearest neighbor algorithm, a decision tree, a random forest, a multilayer perceptron (MLP), a recurrent neural network (RNN), a long short-term memory (LSTM) network, a convolutional neural network (CNN) having VGG architecture or U-net architecture or a combination made up of at least two of the mentioned examples.

The machine learning algorithm can be configured beforehand in order to estimate object states of objects based on the sensor data. An estimated object state can describe, for example a position or location of an object. In addition, the estimated object state can describe at least one variable derived from the position or location, such as a velocity, acceleration, or yaw rate of the object.

For the case in which the machine learning algorithm is an artificial neural network, the deviations can be used, for example, to correct weightings of neural connections of the network step-by-step by back propagation, i.e., to train the network in a monitored learning method. In this case, the deviations, i.e., the errors of the network, are propagated from an output layer of the network back to an input layer of the network and the weightings are changed depending on their respective influence on the errors in such a way that an output of the network in a following time step is closer to a desired output than in a current time step.

The measurements contained in the sensor data can chronologically correspond at least partially to the future object states, i.e., to object states which were predicted based on an output of the machine learning algorithm over multiple time steps. In other words, points in time at which the measurements were carried out can at least partially correspond to points in time which are each associated with a future object state.

To estimate an object state, data from one or more sensors of the same or different types, for example from radar or lidar sensors or a camera, can be processed. In the estimation of the object state, uncertainties or inaccuracies with respect to the measurements and also spurious detections and incorrect detections can be taken into consideration. Object-based or grid-based approaches can be used for this purpose.

In object-based approaches, measurements are associated with an object instance and the object state is calculated using estimation methods. Object-based approaches are model-related, i.e., an object is based on a movement model which is supposed to simulate dynamics of the object, and are suitable above all for objects and situations that can be modeled easily. In this case, for example Kalman filters in combination with a multi-hypothesis tracking method, such as a labeled multi-Bernoulli filter, can be used.

In grid-based approaches, the environment is represented by a grid or lattice, wherein each grid cell represents items of information about a specific position and measurements are projected on the grid. Static objects can be extracted by segmenting. For dynamic objects, particle filters can be used. Grid-based approaches are less model-dependent and are therefore suitable for estimating states of objects that are difficult to model.

A second aspect of the disclosure relates to an evaluation unit which is configured to execute the method as described above and in the following. Features of the method as described above and in the following can also be features of the evaluation unit and vice versa.

A third aspect of the disclosure relates to a vehicle system which is configured to execute the method as described above and in the following. Features of the method as described above and in the following can also be features of the vehicle system and vice versa.

The vehicle system can be configured, for example, to recognize an environment of the vehicle and to control the vehicle automatically in accordance with the recognized environment, i.e., to steer, accelerate, brake, or navigate. The vehicle system can comprise corresponding actuators for this purpose, such as steering or braking actuators or actuators for engine control.

The evaluation unit can be, for example part of an onboard computer of the vehicle.

Further aspects of the disclosure relate to a computer program which, when it is executed on a processor, executes the method as described above and in the following, and a computer-readable medium on which such a computer program is stored.

The computer-readable medium can be, for example a hard drive, a USB storage device, a RAM, ROM, EPROM, or flash memory. The computer-readable medium can also be a data communication network enabling a download of a program code, such as the Internet. The computer-readable medium can be transitory or non-transitory.

Features of the method as described above and in the following can also be features of the computer program and/or the computer-readable medium and vice versa.

Concepts on embodiments of the present disclosure can be considered to be based, inter alia, on the thoughts and findings described hereinafter.

According to one embodiment, the method furthermore comprises a step in which the future object states are transformed into a coordinate system of the at least one sensor unit, in order to obtain a transformed future object state for each of the future object states. In this case, the deviations between the transformed future object states and measurements chronologically corresponding to the transformed future object states can be ascertained based on the sensor data. In other words, the future object states can each be transferred with the aid of a corresponding coordinate transformation into a measurement space of the at least one sensor unit. A direct comparison of the future, i.e., predicted object states to the sensor data is thus enabled.

According to one embodiment, the sensor data can comprise measurements of at least two different sensor units of the sensor system. In this case, the future object states can be transformed into coordinate systems of the at least two different sensor units. A transformed future object state and a measurement, between which a deviation is to be ascertained, can correspond in their coordinate systems. The at least two different sensor units can be sensor units of various sensor types, for example a camera and a radar sensor. For example, a first future object state, which is associated with a first future point in time, can be transformed into a coordinate system of a first sensor unit, while a second future object state, which is associated with a second future point in time following the first future point in time, is transformed into a coordinate system of a second sensor unit differing from the first sensor unit. A third future object state which is associated with a third future point in time following the second future point in time can be transformed into a coordinate system of the first or second sensor unit or also into a coordinate system of a third sensor unit differing from the first and second sensor unit, etc. The ascertainment of the deviations between the transformed future object states and the measurements contained in the sensor data can take place separately for each sensor unit or for each sensor type. In this case, the transformed future object states corresponding to their respective coordinate system are associated with the measurements. A robustness of the method with respect to sensor failures and degradation can be increased by this embodiment.

According to one embodiment, each of the future object states can be transformed into another coordinate system.

According to one embodiment, the sensor data can comprise a first series of measurements and a second series of measurements chronologically following the first series. In this case, the estimated object state can describe a state of the object at an estimation point in time. Each of the future object states can describe a state of the object at a future point in time following the estimation point in time. The measurements of the second series can each be associated with one of the future points in time. In other words, the sensor data can comprise both measurements for a time frame extending from the past up into the present and also measurements for a future time frame, for which object states are to be predicted based on an output of the machine learning algorithm. It is thus possible to compare the future object states to actual measurements.

According to one embodiment, the estimation point in time can be before a point in time of a first measurement of the second series.

According to one embodiment, the estimation point in time can correspond to a point in time of a last measurement of the first series.

According to one embodiment, the method furthermore comprises a step, in which the deviations are weighted based on a respective time interval between the future object states and the estimated object state. In this case, the weighted deviations can be input into the machine learning algorithm. Distance-dependent measurement inaccuracies can thus be compensated for.

According to one embodiment, a sum of the weighted deviations can be calculated. In this case, the sum can be input into the machine learning algorithm. For example, the sum can be calculated in that the deviations are firstly multiplied by a suitable weighting factor and the products resulting therefrom are subsequently added to one another.

BRIEF DESCRIPTION OF THE DRAWINGS

In the following, embodiments of the disclosure are described with reference to the appended drawings, wherein neither the drawings nor the description are to be interpreted as restricting the disclosure.

The figures are solely schematic and are not to scale. Identical reference signs identify identical or identically-acting features in the figures.

DETAILED DESCRIPTION

Figure 1:
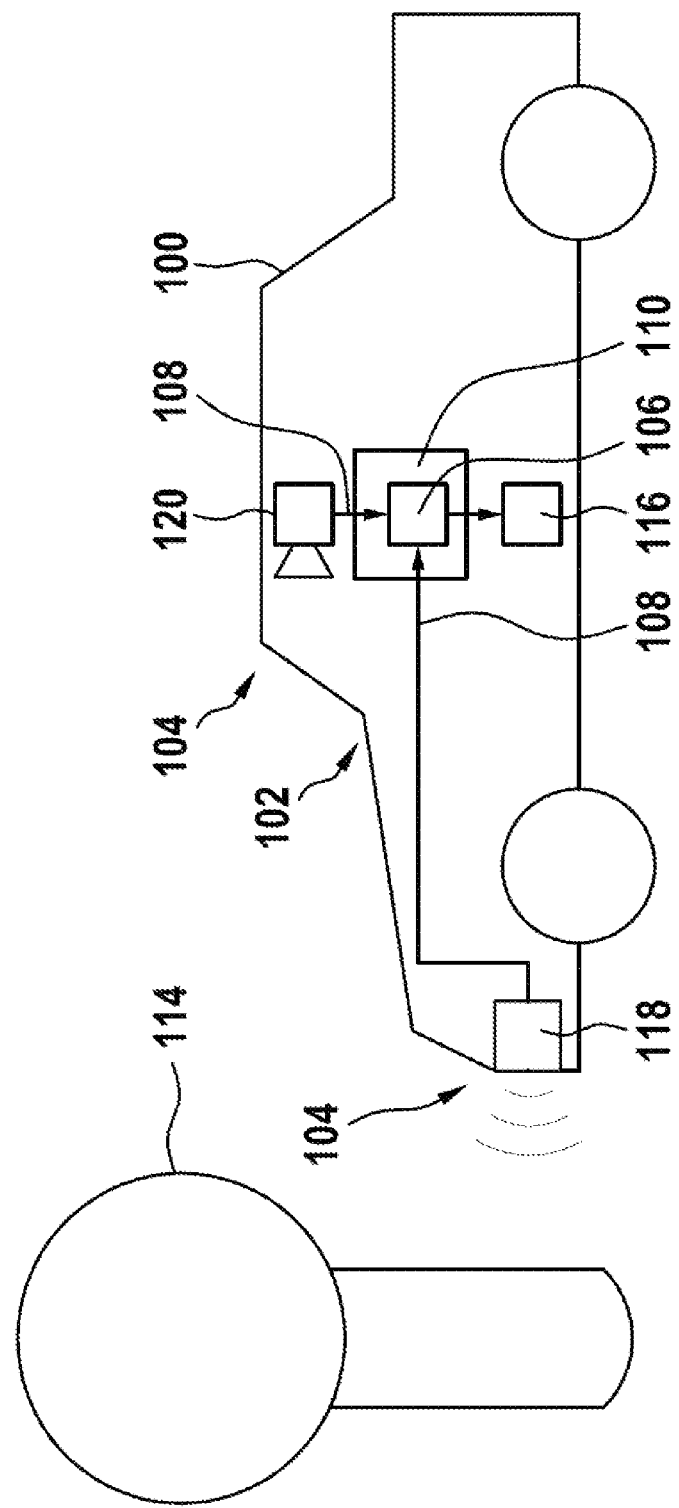
FIG. 1 shows a vehicle system according to one exemplary embodiment of the disclosure.

FIG. 1 shows a vehicle 100 having a vehicle system 102, which comprises a sensor system 104 for registering an environment of the vehicle 100 and an evaluation unit 106 for evaluating sensor data 108 provided by the sensor system 104. The evaluation unit 106 is a component here of an onboard computer 110 of the vehicle 100. The evaluation unit 106 is configured to recognize at least one object 114 in the environment of the vehicle 100 based on the sensor data 108 and to control the vehicle 100 in a corresponding way by means of an actuator system 116, which can comprise, for example, a steering or braking actuator or an actuator for engine control.

For example, the sensor system 104 comprises a radar sensor 118 and a camera 120 for providing the sensor data 108.

The recognition of the environment is carried out with the aid of a machine learning algorithm, which is implemented in the evaluation unit 106, for example with the aid of an artificial neural network. A corresponding method is described in greater detail hereinafter.

Alternatively, it is possible to record the sensor data 108 in the vehicle 100 and to input them into a computer system including the evaluation unit 106 outside the vehicle 100. Using the sensor data 108, the machine learning algorithm, which is executed by the machine learning module 200, can then be optimized by the computer system in the described way. After the optimization, the machine learning module 200 can be installed in the vehicle system 102. The optimized machine learning algorithm can thus be used in the vehicle system 102 without having to be trained in the vehicle 100. In this case, for example, the components 202 to 212 integrated in the vehicle system 102 can be omitted, since the machine learning algorithm was already trained in the computer system located outside the vehicle 100.

Figure 2:
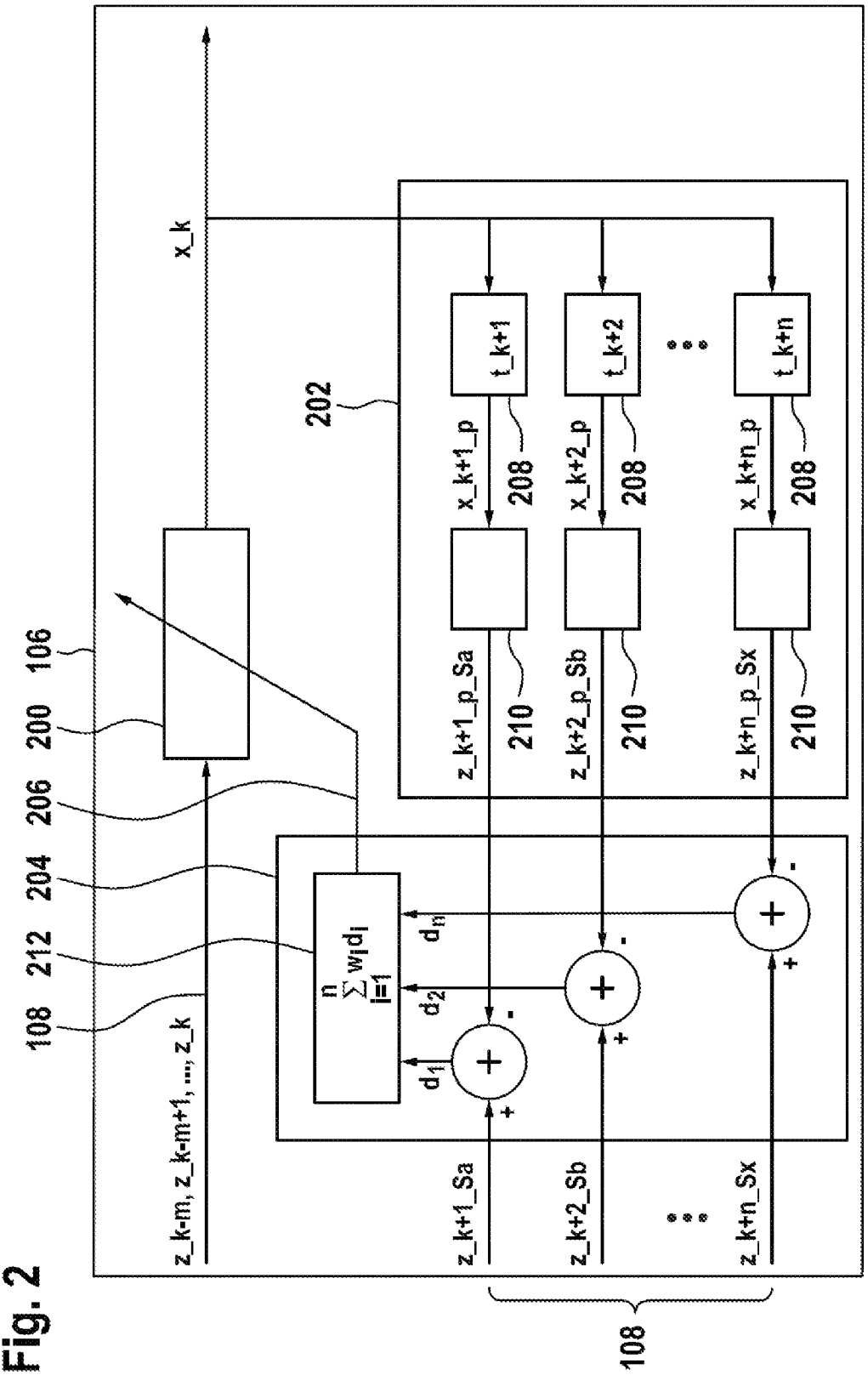
FIG. 2 shows an evaluation unit of the vehicle system from FIG. 1.

A more detailed structure of the evaluation unit 106 is shown as an example in FIG. 2. The modules described hereinafter can be software and/or hardware modules. The evaluation unit 106 comprises a machine learning module 200 for executing the machine learning algorithm, a prediction module 202 for processing outputs of the machine learning module 200, and a comparison module 204 for processing outputs of the prediction module 202. The sensor data 108 provided by the sensor system 104 are entered into each of the machine learning module 200 and the comparison module 204. The comparison module 204 is configured to provide correction data 206 for correcting the machine learning algorithm based on the sensor data 108 and the outputs of the prediction module 202.

The following notation applies for the following description.

$x\_k$: estimated object state of the object 114 at an estimation point in time $t\_k$ $x\_k+n\_p$: future object state of the object 114 at a point in time $t\_k+n$ $z\_k+n\_p$: transformed future object state or predicted measurement of the object 114 at the point in time $t\_k+n$ $z\_k+n\_Sx$: measurement of a specific sensor unit $Sx$ at the point in time $t\_k+n$ $z\_k+n\_p\_Sx$: transformed future object state or predicted measurement of the object 114 for the sensor unit $Sx$ at the point in time $t\_k+n$ A training sequence having non-annotated sensor data 108 is used as the basis. Based on the sensor data 108, the machine learning module 200 determines an estimated object state $x\_k$ of the object 114 at the estimation point in time $t\_k$. The sensor data 108 comprise for this purpose a plurality of chronologically successive measurements $z\_k-m, z\_k-m+1, \ldots, z\_k$, which were carried out at corresponding measurement points in time $t\_k-m, t\_k-m+1, \ldots, t\_k$ by means of the sensor system 104. To determine the estimated object state $x\_k$, the machine learning module 200 can access all measurements contained in the sensor data 108 or also only a subset thereof. The estimation point in time $t\_k$ can correspond to a measurement point in time of the last measurement $z\_k$ carried out.

The prediction module 202 comprises prediction units 208, which are configured to predict future object states $x\_k+1\_p, x\_k+2\_p, \ldots, x\_k+n\_p$ of the object 114 for future points in time t_k+1, t_k+2, . . . , t_k+n based on dynamic components of the estimated object state x_k, such as velocity or acceleration, wherein the estimation point in time t_k lies before the future points in time.

For example, a position of the object 114 at the future point in time t_k+1 results as:

$$pos\_k+1 = pos\_k + (t\_k+1 - t\_k) * v\_k.$$

In this case, pos_k is the position and v_k is the velocity of the estimated object state x_k.

In addition to the measurements z_k−m, z_k−m+1, . . . , z_k, the sensor data 108 also comprise measurements z_k+1, z_k+2, . . . , z_k+n at the future points in time t_k+1, t_k+2, . . . , t_k+n.

Furthermore, the prediction module 202 comprises transformation units 210, which are configured to transform the future object states x_k+1_p, x_k+2_p, . . . , x_k+n_p with the aid of corresponding sensor models in a respective measurement space of multiple sensor units Sa, Sb, Sx of the sensor system 104, among them the radar sensor 118 and the camera 120. Transformed future object states z_k+1_p_Sx, z_k+2_p_Sx, . . . , z_k+n_p_Sx result therefrom, which are entered in the comparison module 204 and are compared there to corresponding measurements z_k+1_Sx, z_k+2_Sx, . . . , z_k+n_Sx.

For example, in the case of such a transformation, a two-dimensional position of the future object state x_k+n_p is transformed into polar coordinates in order to obtain a predicted measurement of the radar sensor 118.

By way of the transformation units 210, measurements at later points in time t_k+n can be used as training data for the machine learning algorithm. Annotated sensor data can thus be omitted. The suffixes Sa, Sb, Sx in the measurements mean that the measurements originate from a sensor unit or generally from a sensor modality a, b, or x, respectively. A corresponding sensor model is required for each sensor modality. In the case of the camera 120, for example a position size of an object state is transformed into image coordinates. In the case of the radar sensor 118, for example, Cartesian position sizes of an object state are transformed into polar coordinates. However, more complex transformations may theoretically also be integrated into the sensor models.

As soon as the measurements z_k+1_Sa, z_k+2_Sb, . . . , z_k+n_Sx are provided, the sensor model matching with these measurements is selected in the prediction module 202. It is thus possible to react flexibly to any failure of specific sensor units. The sensor data 108 thus do not necessarily have to contain all measurements registered or theoretically able to be registered by the sensor system 104.

Differences $d_1, d_2, \ldots d_n$, which are each multiplied by a weighting factor $w_i$ in a weighting unit 212 of the comparison module 204 and subsequently summed, result from the comparison of the transformed future object states to the associated measurements. The sum of the weighted differences is passed on in the form of the correction data 206 to the machine learning module 200, in order to optimize the machine learning algorithm and thus an estimation of states of objects in the environment of the vehicle 100. In this case, this is merely an example of a possible implementation of a weighting of the differences $d_1, d_2, \ldots, d_n$. These can also be weighted in any other way. For example, the non-weighted or weighted differences can also be supplied separately to the machine learning module 200 instead of as a sum. Instead of a summation, other mathematical operations can also be used here.

For example, measurements in the near future can be weighted differently than measurements in the far future. This is desirable, for example in the case of very remote objects which the vehicle 100 is approaching. Thus, measurements in the near future are measured from the distance and can be less accurate than measurements in the far future which are measured from up close. The terms "near future" and "far future" refer here to the point in time t_k at which the estimated object state x_k is determined.

The described process can be repeated for subsequent points in time in a similar way. In this case, for example, for an estimated object state x_k+1, future object states x_k+2_p, x_k+3_p, . . . , x_k+n+1_p are predicted, and transformed future object states z_k+2_p_Sx, x_k+3_p_Sx, . . . , x_k+n+1_p_Sx are determined and compared to corresponding measurements z_k+2_Sx, z_k+3_Sx, . . . , z_k+n+1_Sx in order to provide the correction data 206.

State variables mutually influence one another over time. For example, a position in the future can be concluded from a current position and velocity, while an orientation in the future can be concluded from a current orientation and yaw rate. Conversely, this means that states in the present can be concluded to a certain extent from states in the future. For example, the machine learning algorithm could now be trained using the states from the future. Instead, existing measurements from the future are more or less used in the present here.

The machine learning algorithm is thus trained as follows. If measurements from the present have this and that form, a state of the object 114 is thus to be estimated so that it matches as well as possible with the measurements of the future. In operation, the machine learning algorithm has then already learned how a state is to be estimated in the case of measurements having a certain form.

The number m or the number n can vary depending on the requirement.

For example, the measurements can follow one another very closely chronologically. This can be the case in particular in a multisensor structure. An excessively short time interval between a currently estimated object state and a subsequent future object state can result in correspondingly small differences between the further future object states. Since the sensor data 108 are generally subject to measurement noise, these small state changes can possibly not be reflected representatively by the measurements.

The evaluation unit 106 can be configured in order to adapt the number n in running operation to time intervals between the subsequent measurements. This is advantageous since, for example in a multisensor structure, the sensors generally do not run synchronously. Therefore, measurements can follow one another very closely chronologically in certain sections, while measurements in certain other sections can in turn be chronologically very remote from one another. The time frame which the subsequent n measurements occupy can be in the millisecond range or also greater depending on the application.

The number m can vary depending on the type of the machine learning algorithm used and depending on the processing capacity of the evaluation unit 106.

Figure 3:
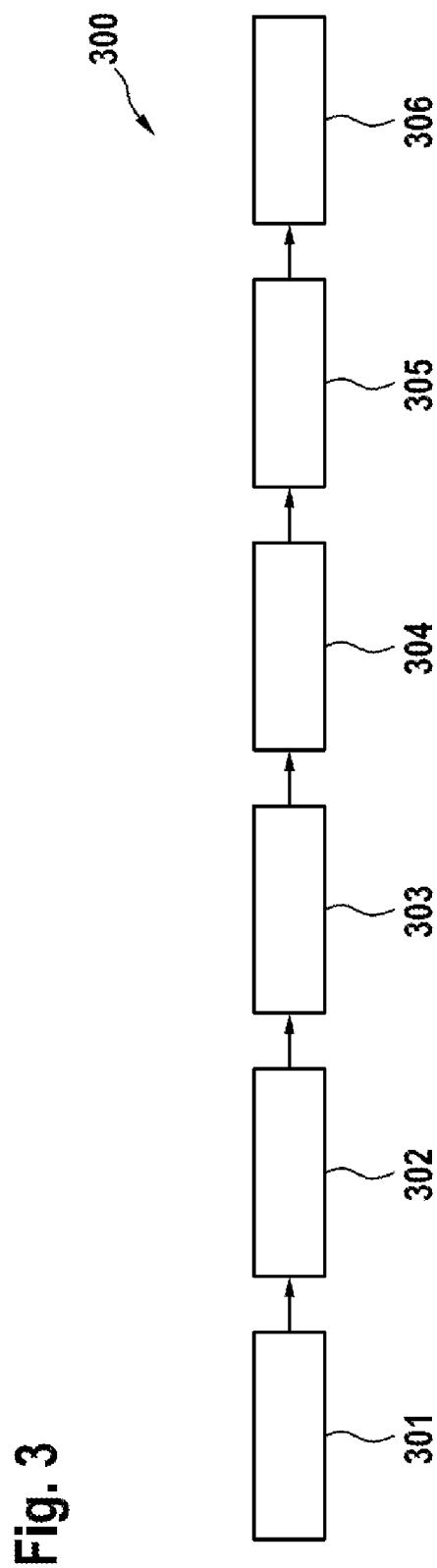
FIG. 3 shows a flow chart of a method as can be executed by the evaluation unit from FIG. 2.

FIG. 3 shows a possible sequence of a method 300, as can be executed by the evaluation unit 106 shown in FIGS. 1 and 2.

In this case, the sensor data 108 are read in in a first step 301.

In a second step 302, the sensor data 108 are input into the machine learning module 200.

In a third step 303, the estimated object state x_k is output by the machine learning module 200.

In a fourth step 304, the chronologically successive future object states x_k+n_p are predicted based on the estimated object state x_k.

In a fifth step 305, the differences $d_1, d_2, \ldots, d_n$ are ascertained from the future object states x_k+n_p and the associated measurements z_k+n based on the sensor data 108.

In a sixth step 306, the differences $d_1, d_2, \ldots, d_n$ are finally provided to the machine learning module 200 for optimizing the object recognition.

Finally, it is to be noted that terms such as "including", "comprising" etc. do not exclude other elements or steps and terms such as "a" or "one" do not exclude a plurality. Reference signs in the claims are not to be viewed as a restriction.

What is claimed is:

1. A method for recognizing objects in an environment of a vehicle, the vehicle comprising a sensor system having at least one sensor unit for registering the environment and an evaluation unit for evaluating sensor data provided by the at least one sensor unit, the method comprising:
   receiving the sensor data in the evaluation unit, the sensor data comprising a plurality of chronologically successive measurements generated by the at least sensor unit;
   inputting the sensor data into a machine learning algorithm of a machine learning module;
   outputting an estimated object state of at least one object estimated based on the sensor data by way of the machine learning module;
   determining a plurality of chronologically successive future object states based on the estimated object state;
   transforming the future object states into a coordinate system of the at least one sensor unit to obtain a transformed future object state for each of the future object states;
   ascertaining deviations between the transformed future object states and measurements chronologically corresponding to the transformed future object states based on the sensor data; and
   correcting the machine learning algorithm based on the deviations.

2. The method according to claim 1, wherein:
   the sensor data comprise measurements of at least two different sensor units of the sensor system;
   the future object states are transformed into coordinate systems of the at least two different sensor units; and
   the transformed future object state and the measurement between which the deviation is to be ascertained correspond in their coordinate systems.

3. The method according to claim 2, wherein each of the future object states is transformed into a different coordinate system.

4. The method according to claim 1, wherein:
   the sensor data comprise a first series of measurements and a second series of measurements chronologically following the first series;
   the estimated object state describes a state of the object at an estimation point in time;
   each of the future object states describes a state of the object at a future point in time following the estimation point in time; and
   the measurements of the second series are each associated with one of the future points in time.

5. The method according to claim 4, wherein the estimation point in time is before a point in time of a first measurement of the second series.

6. The method according to claim 4, wherein the estimation point in time corresponds to a point in time of a last measurement of the first series.

7. The method according to claim 1, further comprising:
   determining weighted deviations from the deviations, the weighted deviation based on a respective time interval between the future object states and the estimated object state,
   wherein the weighted deviations are input into the machine learning algorithm of the machine learning module.

8. The method according to claim 7, wherein:
   a sum is calculated from the weighted deviations; and
   the sum is input into the machine learning algorithm of the machine learning module.

9. The method according to claim 1, wherein the evaluation unit is configured to execute the method.

10. A vehicle system, including:
    a sensor system having at least one sensor unit configured to register an environment of a vehicle; and
    an evaluation unit operably connected to the sensor system, and configured to evaluate sensor data received from the at least one sensor unit, the sensor data comprising a plurality of chronologically successive measurements;
    wherein the evaluation unit is configured to recognize objects in an environment of the vehicle and is configured to:
    input the sensor data into a machine learning algorithm of a machine learning module;
    output an estimated object state of at least one object estimated based on the sensor data by way of the machine learning module;
    determine a plurality of chronologically successive future object states based on the estimated object state;
    transform the future object states into a coordinate system of the at least one sensor unit to obtain a transformed future object state for each of the future object states;
    ascertain deviations between the transformed future object states and measurements chronologically corresponding to the transformed future object states based on the sensor data; and
    correct the machine learning algorithm based on the deviations.

11. The vehicle system according to claim 10, wherein:
    the sensor data comprise measurements of at least two different sensor units of the sensor system,
    the evaluation unit is further configured to transform the future object states into coordinate systems of the at least two different sensor unit, and
    the transformed future object state and the measurement between which the deviation is to be ascertained correspond in their coordinate systems.

* * * * *